United States Patent
Ota et al.

(10) Patent No.: US 7,430,454 B2
(45) Date of Patent: Sep. 30, 2008

(54) MULTI-TRACK DIGITAL RECORDING AND REPRODUCING APPARATUS

(75) Inventors: Mitsuhiko Ota, Hamamatsu (JP); Shoji Mita, Hamamatsu (JP)

(73) Assignee: Yamaha Corporation, Hamamatsu-Shi (JP)

( * ) Notice: Subject to any disclaimer, the term of this patent is extended or adjusted under 35 U.S.C. 154(b) by 1113 days.

(21) Appl. No.: 10/165,375

(22) Filed: Jun. 7, 2002

(65) Prior Publication Data

US 2002/0188364 A1    Dec. 12, 2002

(30) Foreign Application Priority Data

Jun. 11, 2001    (JP)    ............... 2001-176383

(51) Int. Cl.
*G06F 17/00*    (2006.01)
(52) U.S. Cl. ........................... 700/94; 381/119
(58) Field of Classification Search ............ 700/94; 381/119
See application file for complete search history.

(56) References Cited

U.S. PATENT DOCUMENTS 4,635,288 A * 1/1987 Stadius ................. 381/119

2001/0013269 A1    8/2001    Tanji
2001/0017076 A1    8/2001    Fujita
2003/0091329 A1 *  5/2003    Nakata et al. ............. 386/52

OTHER PUBLICATIONS

Roland Corporation, VS-1680 Owner's Manual, copyright 1998, pp. 1-214.*
"Owner's Manuel VS-2480, 24Bit/24Track Digital Studio Workstation", Roland Corporation, 2001.

* cited by examiner

*Primary Examiner*—Sinh Tran
*Assistant Examiner*—Walter F Briney, III
(74) *Attorney, Agent, or Firm*—Morrison & Foerster LLP

(57) ABSTRACT

A multi-track digital recording/reproducing apparatus for recording/reproducing multi-track digital audio data, comprises: a multi-track recorder that records/reproduces digital audio data to/from a plurality of recording tracks; a mixing bus that selectively inputs data from a plurality of mixer input channels and data reproduced by the multi-track recorder, mixes the input data, and outputs the mixed input data; a track assigner that assigns and records the mixed input data or data directly input from the plurality of mixer input channels to at least one of the plurality of recording tracks; and a quick recording setting device that selects a mixer input channel, assigns a direct output of the selected mixer input channel to a designated recording track, and releases a recording assignment of a unselected mixer input channel without changing all setting states.

6 Claims, 14 Drawing Sheets

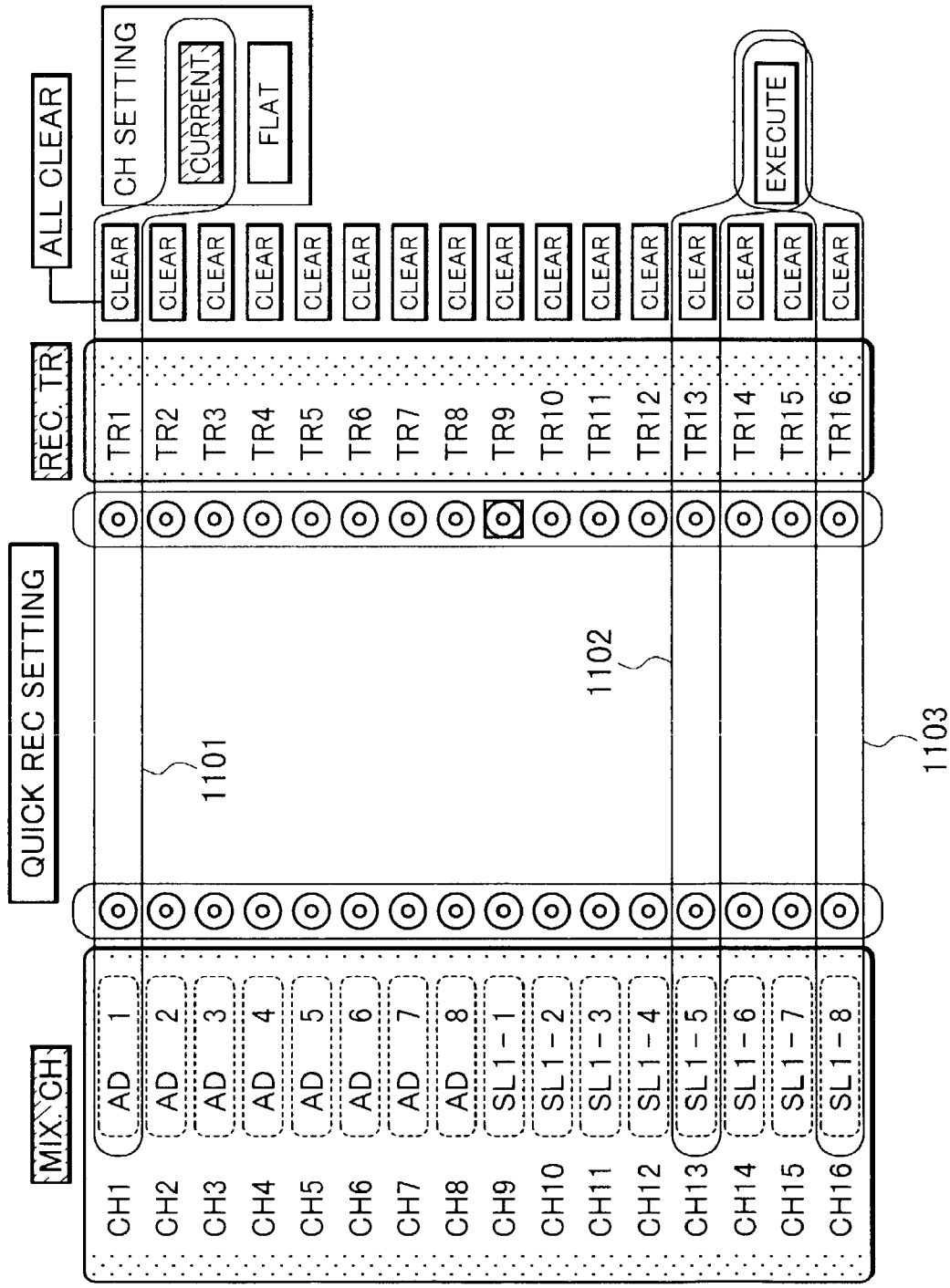

MULTI-TRACK DIGITAL RECORDING AND REPRODUCING APPARATUS

CROSS REFERENCE TO RELATED APPLICATION

This application is based on Japanese Patent Application No. 2001-176383, filed on Jun. 11, 2001, the entire contents of which are incorporated herein by reference.

BACKGROUND OF THE INVENTION

A) Field of the Invention

The present invention relates to a recording/reproducing apparatus for recording digital audio data in an external storage unit such as a hard disk and reproducing it by a multi-track method.

B) Description of the Related Art

A digital mixer converts audio data of an input analog signal into digital data or directly inputs digital audio data and mixes digital audio data for output. A digital recorder records and reproduces digital audio data in an external storage unit such as a hard disk. A multi-track digital recorder is known as one type of the digital recorder that can record a plurality series of audio data into a plurality of tracks. An apparatus that features the functions of both a digital mixer and a multi-track digital recorder is available nowadays.

Some apparatus having features of both a digital mixer and a multi-track digital recorder can patch (selectively wire) each signal to be input into each input channel. With this patch function, a plurality of analog input signals, a plurality of digital input signals, and a plurality of input signals from internal samplers, external effectors and the like can be assigned to desired input channels of a digital mixer. Some apparatus can set the output bus of each input channel or a direct output of each input channel. With this function, input signals to the input channels of the digital mixer can be set to be output to a plurality of mixing buses such as mixing buses and stereo buses or to be output directly without mixing. A directly output signal or an output signal from a bus such as a mixing bus can be assigned to a desired record track of the digital recorder.

Since a plurality of input signals and recording channels are patched, patch settings for recording input signals require much labor. To avoid this, some apparatus is provided with a quick record setting (quick REC) function of facilitating a patch of input signals if they are recorded without being mixed with other signals. FIG. 13 shows a quick REC window displayed when an operator unit is manipulated in a predetermined manner. By using this window, a plurality of input channels, routing and a plurality of tracks can be set collectively so as to match initial recording.

Referring to FIG. 13, INPUT CH 1301 represents an input signal. For example, analog inputs of eight channels, inputs of eight channels of cards entered into slots and other inputs can be selected. In MIXER CH 1302, two blocks of mixer channels #1 to #8 and mixer channels #9 to #16 of the digital mixer are displayed in a fixed state. Similarly, in REC TR 1303, two blocks of record track numbers #1 to #8 and record track numbers #9 to #16 are displayed in a fixed state. The blocks of MIXER CH and REC TR cannot be changed by using an operator unit.

By properly setting INPUT CH 1301 and clicking EXECUTE 1304 shown in the window, an input patch is established so that each input displayed in INPUT CH 1301 is input to each input channel displayed in MIXER CH 1302.

An output of each channel displayed in MIXER CH 1302 is directly input to each track of an internal recorder displayed in REC TR 1303.

With this quick REC function, settings are performed in the unit of eight input channels and eight tracks so that flexible settings are difficult. For example, if signals have already been recorded in the track #2 and new signals are to be recorded in other tracks without erasing the track #2, it is necessary to first perform the quick REC settings for the tracks #1 to #8 and thereafter designate the track #2 as non-record.

Also with the quick REC function, it is impossible to change an input signal to an input channel. Namely, it is necessary to assign an input signal to an input channel by using another setting window before or after the quick REC setting.

Also with the quick REC function, it is necessary to perform initial settings (initial characteristics settings) of a compressor, equalizer, fader and the like of each input channel. These initial settings are performed in order to avoid an unpleasant event. For example, if the fader was enhanced or the compressor was set greatly immediately before the quick REC settings, recording in this state without readjustment results in recording with improper inputs.

However, there is a need for performing recording with the input channel conditions adjusted immediately before the quick REC settings. The specification of the quick REC function does not satisfy such a need.

SUMMARY OF THE INVENTION

An object of this invention is to provide a recording/reproducing apparatus which combines a digital mixer and a multi-track digital recorder and which can easily and flexibly set a patch between record source signals and record tracks.

According to one aspect of the present invention, there is provided a multi-track digital recording/reproducing apparatus for recording/reproducing multi-track digital audio data, comprising: a multi-track recorder that records/reproduces digital audio data to/from a plurality of recording tracks; a mixing bus that selectively inputs data from a plurality of mixer input channels and data reproduced by the multi-track recorder, mixes the input data, and outputs the mixed input data; a track assigner that assigns and records the mixed input data or data directly input from the plurality of mixer input channels to at least one of the plurality of recording tracks; and a quick recording setting device that selects a mixer input channel, assigns a direct output of the selected mixer input channel to a designated recording track, and releases a recording assignment of a unselected mixer input channel without changing all setting states.

According to another aspect of the present invention, there is provided a multi-track digital recording/reproducing apparatus for recording/reproducing multi-track digital audio data, comprising: a multi-track recorder that records/reproduces digital audio data to/from a plurality of recording tracks; an input channel assigner that selectively assigns input terminals to a plurality of mixer input channels respectively; a mixing bus that selectively inputs data from the plurality of mixer input channels and data reproduced by the multi-track recorder, mixes the input data, and outputs the mixed input data; a track assigner that assigns and records the mixed input data or data directly input from the plurality of mixer input channels to at least one of the plurality of recording tracks; a display that displays quick recording setting window graphically showing states of the plurality of mixer input channels and the plurality of recording tracks; an assignment changer that changes an assignment of an input terminal to a mixer input channel in the quick recording setting window; a patching device that patches a mixer input channel and a recording track; and an executing device that execute the assignment by the assignment changer and the patching device in accordance with an instruction of an execution.

According to a further aspect of the present invention, there is provided a patch setting apparatus for patching signal processors comprising: a display that displays a quick recording setting window graphically showing a first group of terminals, a second group of terminals, a predetermined operator, a parameter, and a cursor; a manipulator that moves and manipulates the cursor on the first group of terminals, the second group of terminals, the predetermined operator and the parameter in the quick recording setting window; a limiter that sets a cursor movement limit-mode for limiting a movement of the cursor on the first group of terminals and the second group of terminals when the cursor is manipulated on a terminal of the first or the second group, and highlights the manipulated terminal; and a patching device that selectively wires, in the limit-mode, the manipulated terminal of one group and one of terminals of another group.

According to a still further aspect of the present invention, there is provided a multi-track digital recording/reproducing apparatus for recording/reproducing multi-track digital audio data, comprising: a multi-track recorder that records/reproduces digital audio data to/from a plurality of recording tracks; an input channel assigner that selectively assigns input terminals to a plurality of mixer input channels respectively; a mixing bus that selectively inputs data from the plurality of mixer input channels and data reproduced by the multi-track recorder, mixes the input data, and outputs the mixed input data; a track assigner that assigns and records the mixed input data or data directly input from the plurality of mixer input channels to at least one of the plurality of recording tracks; a display that displays quick recording setting window graphically showing states of the plurality of mixer input channels and the plurality of recording tracks, a predetermined operator, a parameter, and a cursor; a manipulator that moves and manipulates the cursor on the plurality of mixer input channels, the plurality of recording tracks, the predetermined operator and the parameter in the quick recording setting window; a limiter that sets a cursor movement limit-mode for limiting a movement of the cursor on the plurality of mixer input channels and the plurality of recording tracks when the cursor is manipulated on a terminal of the plurality of mixer input channels or the plurality of recording tracks, and highlights the manipulated channel or track; and a patching device that selectively wires, in the limit-mode, the manipulated channels or tracks.

Quick record setting is possible in the unit of one input channel and one track so that quick record setting can be performed flexibly. It is possible to select and set an input signal to an input channel by using a quick record setting window. Since the conditions adjusted immediately before the quick record setting can be maintained, inconvenience associated with forcible initialization can be avoided.

BRIEF DESCRIPTION OF THE DRAWINGS

FIG. 11 is a diagram illustrating a cursor motion (up and down directions) on a quick record setting window.

DESCRIPTION OF THE PREFERRED EMBODIMENTS

Figure 1:
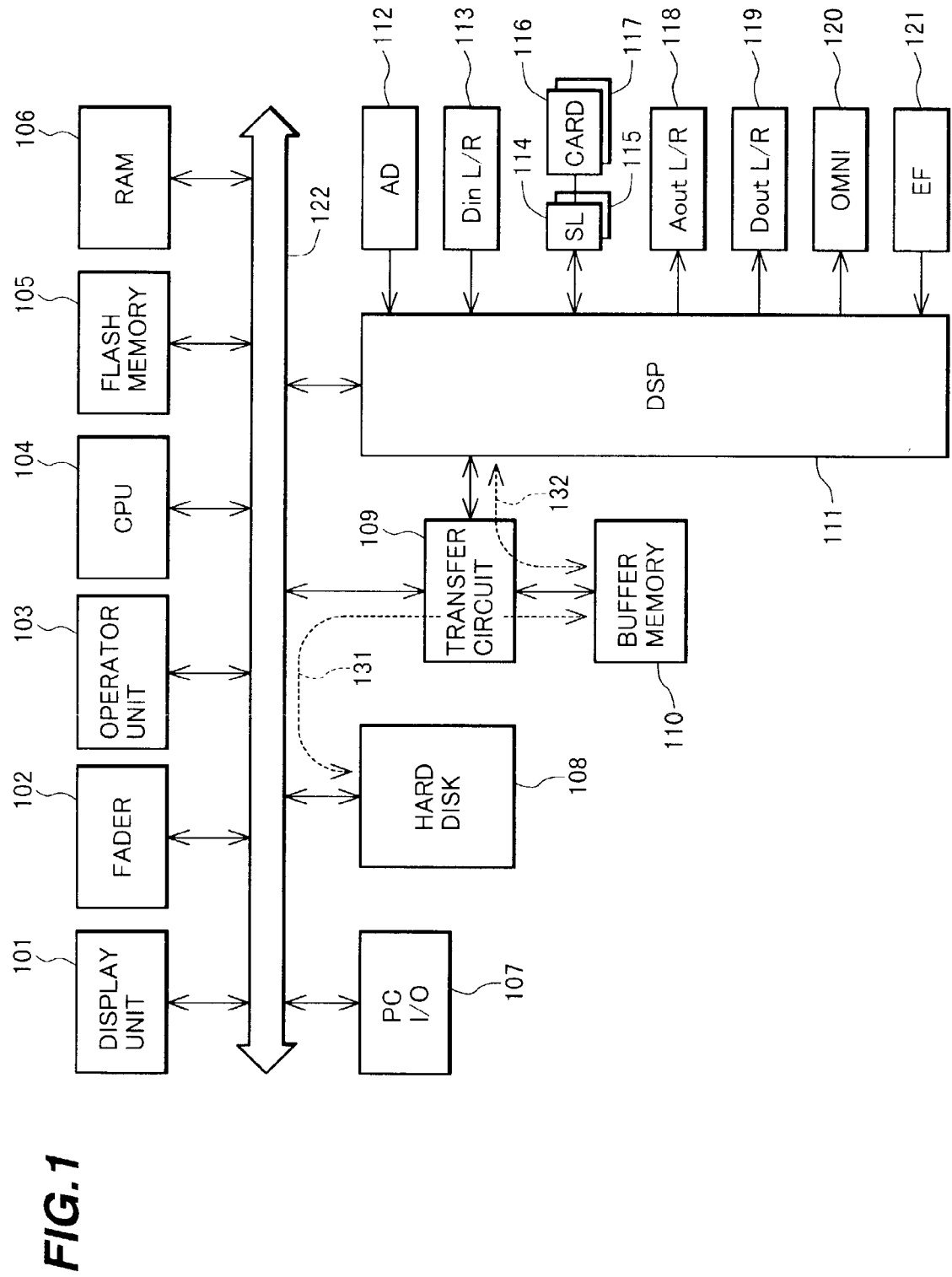
FIG. 1 is a block diagram showing the overall structure of a multi-track digital recording/reproducing apparatus having a mixing function according to an embodiment of the invention.

FIG. 1 is a block diagram showing the overall structure of a multi-track digital recording/reproducing apparatus having a mixing function according to an embodiment of the invention. This apparatus has a display unit 101, a fader 102, an operator unit 103, a CPU 104, a flash memory 105, a random access memory (RAM) 106, an input/output (I/O) interface 107 to and from a personal computer, a hard disk (HD) 108, a transfer circuit 109, a buffer memory 110, a digital signal processor (DSP) 111, and a bus line 122. External connection terminals include an analog input (AD) 112, a digital input (Din L/R) 113, slots (SL) 114 and 115, an analog output (Aout L/R) 118, a digital output (Dout L/R) 119, an omni-output (OMNI) 120, and an external effector (EE) 121.

The analog input (AD) 112 is constituted of eight analog audio data input terminals. Analog audio data input to the input terminals is converted by an analog-digital converters (not shown) and input to DSP 111. The digital input (Din L/R) 113 is constituted of digital audio data input terminals of stereo two channels. The analog output (Aout L/R) 118 is constituted of external terminals for converting outputs of stereo two channels from DSP 111 into analog signals and outputting the analog signals. The digital output (Dout L/R) 119 is constituted of digital output terminals of stereo two channels of digital audio signals from DSP 111. The omni-output (OMNI) 120 is constituted of digital data output terminals of four channels of digital audio data from DSP 111. The external effector (EE) input 121 is constituted of input terminals of stereo two channels each having two series (four channels in total) of data from an external effector.

The slots (SL) 114 and 115 are constituted of two expansion slots mounted on the apparatus. Various types of option cards can be inserted into the expansion slots. FIG. 1 shows an example of a card 116 inserted into the expansion slot 114 and a card 117 inserted into the expansion slot 115. For example, the cards 116 and 117 are an analog—digital converter card for analog input, a digital I/O card, a digital —analog converter card for analog output and the like. By inserting these cards into the slots 114 and 115, it is possible to increase the number of input/output terminals for external connections. An input card capable of receiving eight channels at a maximum can be inserted, and an output card capable of outputting eight channels at a maximum can be inserted.

The display unit 101 is a display such as a liquid crystal display for displaying various information. The fader 102 is an operator unit of a slide volume type capable of adjusting the level of an input or output channel assigned as desired. The operator unit 103 includes various types of switches. CPU 104 controls the whole operation of the apparatus. The flash memory 105 stores control programs and the like to be executed by CPU 104. RAM 106 is used for an area in which programs stored in HD 108 are loaded to be executed by CPU 104, and for a working area. The I/O interface 107 to and from a personal computer (PC) is used for connection to PC. The hard disk (HD) 108 is an external storage unit for storing programs to be executed by CPU 104 and various data, and has a digital audio data record area. The buffer memory 110 temporarily stores recording/reproducing data when recording/reproducing is performed by using HD 108. The digital signal processor (DSP) 111 performs an audio data mixing process, an effect adding process and the like.

The transfer circuit 109 controls a data transfer 131 between HD 108 and buffer memory 110 and a data transfer 132 between DSP 111 and buffer memory 110 in accordance with an instruction from CPU 104. Recording/reproducing by HD 108 is performed by a multi-track method (track is a concept of series for audio data recording/reproducing and is different from a physical record area track concentrically disposed on the disk of HD). The fundamental operation of the transfer circuit 109 for one track recording is to receive record data of one sample from DSP at each sampling period and write it in the buffer memory 110, and to transfer samples of one cluster loaded in the buffer memory to a corresponding track record area of HD 108, an operation of receiving and writing record data continuing during the transfer operation. The fundamental operation of the transfer circuit 109 for one track reproducing is to read samples of top two or more clusters of the track from HD 108 and write them in the buffer memory, to read one sample from the buffer memory 110 at each sampling period and transfer it to DSP 111, and when an empty area (buffer area of already reproduced samples) of one cluster is formed in the buffer memory, to transfer data of the next cluster to the empty area from HD 108.

Figure 2:
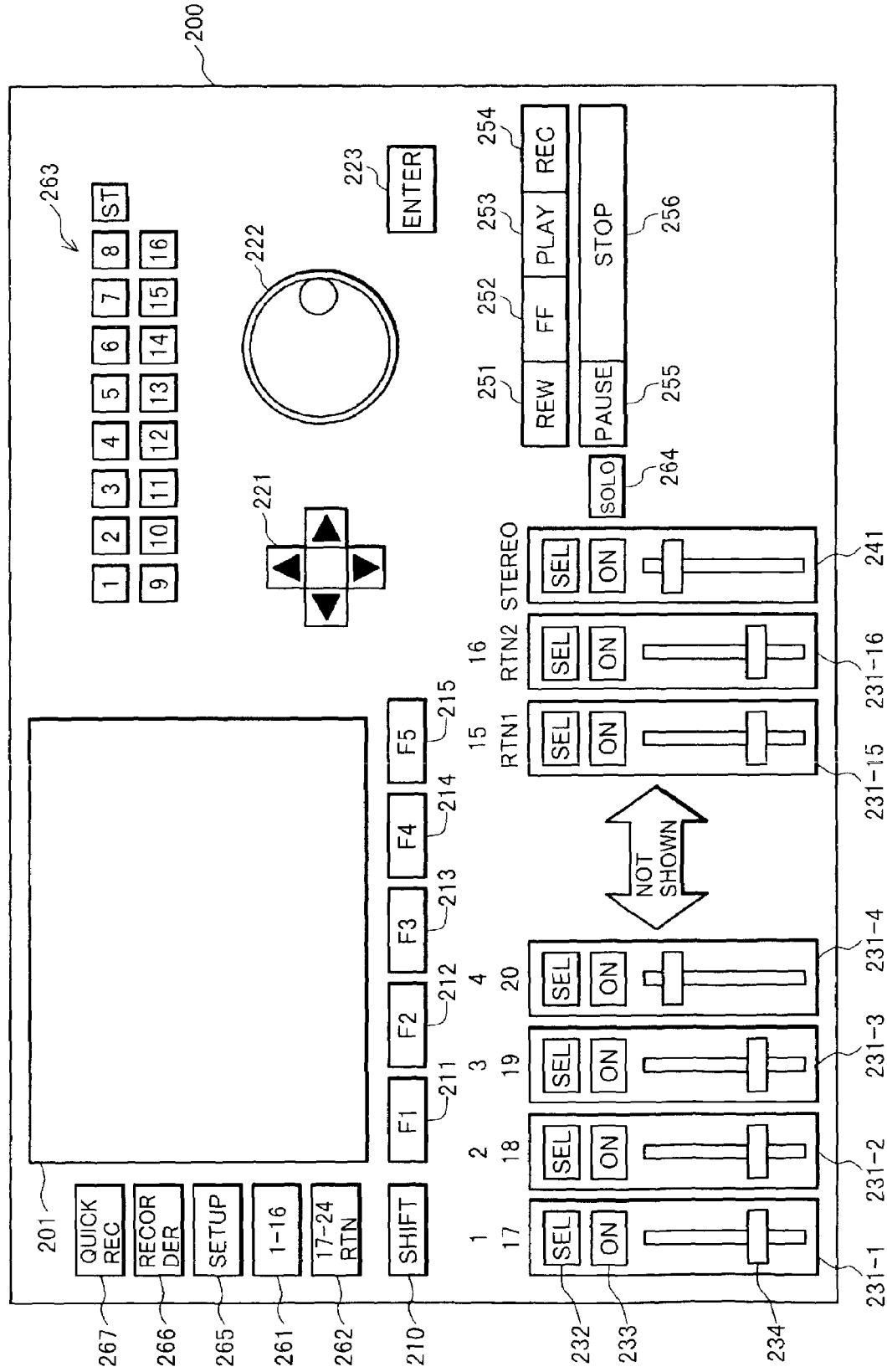
FIG. 2 is a diagram showing the panel of the apparatus shown in FIG. 1.

The cluster is a minimum logical unit for data read/write of HD 108. FIG. 2 is a diagram showing the panel of the apparatus shown in FIG. 1. On this panel, the display unit 101, fader 102 and operation unit 103 shown in FIG. 1 are mounted. A display 201 corresponds to the display unit 101 shown in FIG. 1. Reference numeral 210 represents a shift key, and reference numerals 211 to 215 represent F1 to F5 keys. Reference numeral 221 represents cursor motion keys for moving a cursor displayed on the display 201, and reference numeral 223 represents an enter key. Reference numeral 222 represents a value input operator unit (data input dial) for setting or changing a value of various data.

Operator sets 231-1 to 231-16 are assigned to mixer input channels and control the corresponding mixer input channels, as will be described later.

The mixer input channel is an input series to a mixing bus. There are twenty four channels from the mixer input channel #1 to mixer input channel #24, the details of the mixer input channel be given later with reference to FIG. 3. A SEL key 232 of the operator set 231-1 is used for displaying a window of the mixer input channel to perform various settings (frequency characteristics adjustment, control of the compressor, panning and the like). An ON key 233 is used for switching between on/off of the mixer input channel. A fader operator unit (of a slider volume type) 234 is used for adjusting the volume level of the mixer input channel. The SEL key 232 and ON key 233 are toggle switches which emit light when they are depressed and enter a select state, and extinguish light when they are again depressed and enter a non-select state. When a 1-16 channel select key 261 is depressed, the operator set 231-1 is assigned to the mixer input channel #1 and can control the mixer input channel #1. When a 17-24 channel select key 262 is depressed, the operator set 231-1 is assigned to the mixer input channel #17 and can control the mixer input channel #17. In order to indicate this, numerals "1" and "17" are printed on the panel above the operator set 231-1.

On the right side of the operator set 231-1, similar operator sets 231-2 to 231-16 are mounted. Numerals printed above each operator set indicate the mixer input channels to be controlled by the operator set when the 1-16 channel select key 261 or 17-24 channel key 262 is turned on. Above the operator sets 231-15 and 231-16 for controlling the mixer input channels #15 and #16, "RTN1" and "RTN2" are printed under the numerals "15" and "16". This means that when the 17-24 channel selection key 262 is turned on, these operator sets 231-15 and 231-16 are allocated as the operator sets for controlling two effect return channels 313 shown in FIG. 3. An operator set 241 is used for controlling the final outputs of stereo two channels.

When a SOLO key 264 is turned on (when the key top of the SOLO key illuminates) and one of the ON keys 233 of the channels is turned on, only sounds of this channel are output. A REW key 251, an FF key 252, a PLAY key 253, a REC key 254, a PAUSE key 255 and a STOP key 256 are used for rewind, fast forward, play, record, pause and stop, respectively.

Record track switches 263 are used for selecting a record track. By turning on one of the record track switches labeled "1" to "16", the track having the corresponding track number becomes recordable. By turning on a SETUP key 265, an input/output patch to be described later becomes settable. By turning on a RECORDER key 266, it is possible to perform adjustments of the frequency characteristics and volume level (by the fader) and controls of the compressor, panning and the like (by SEL keys) by using the operator sets 231-1 to 231-16 shown in FIG. 2, with respect to recorder channels 320 to be described later with reference to FIG. 3. By turning on a QUICK REC key 267, a QUICK REC window to be described with reference to FIG. 6 and following Figures is displayed to facilitate a plurality of assignment operations.

Figure 3:
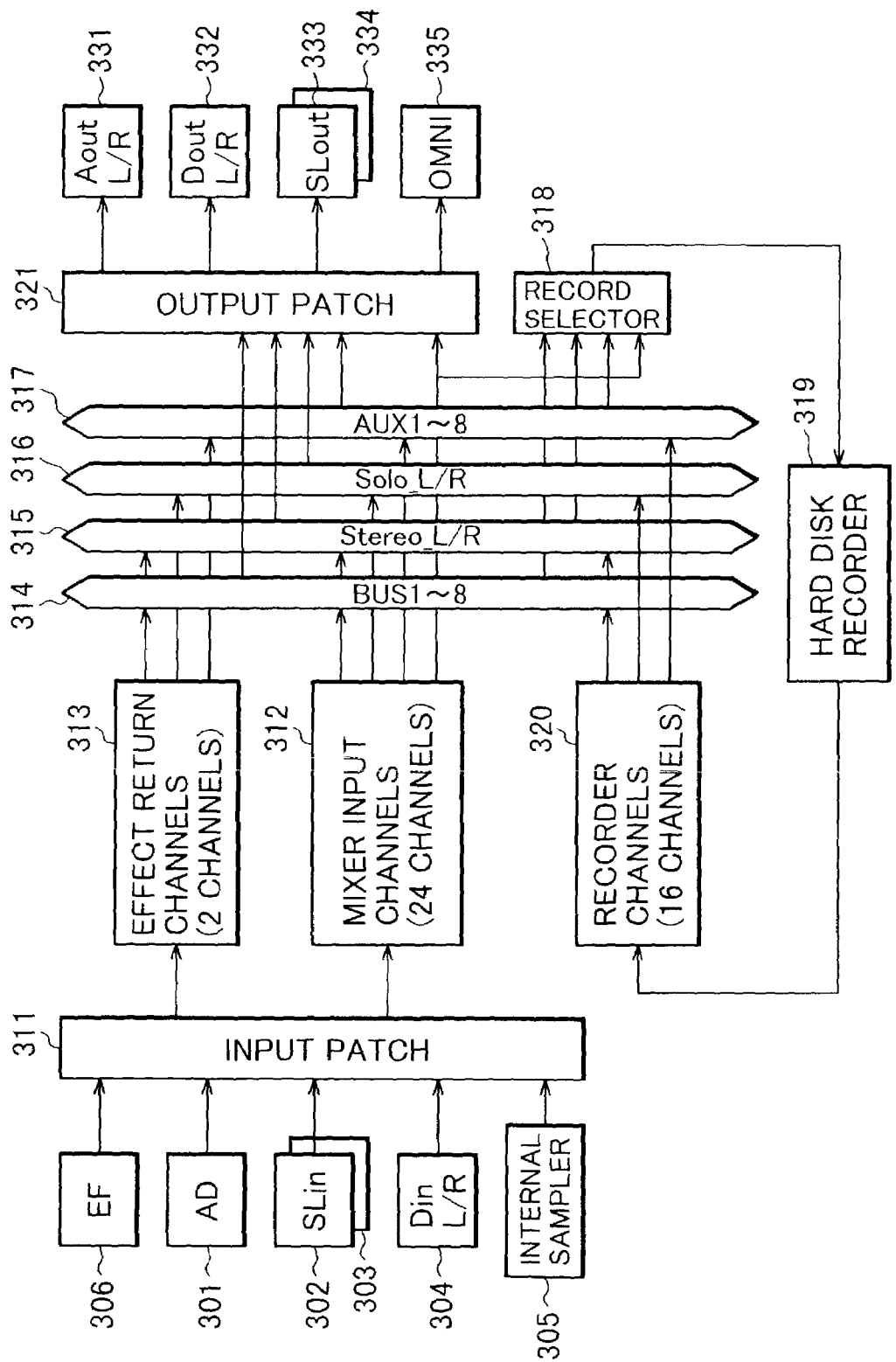
FIG. 3 is a block diagram illustrating the outline of a mixing process.

FIG. 3 is a block diagram showing the outline of a mixing process to be realized by DSP 111. AD 301 represents signals of eight channels converted into digital signals and input from the analog input (AD 112 shown in FIG. 1). SLin 302 and 303 represent inputs from input option cards inserted into the two slots (SL 114 and 115 shown in FIG. 1). A card capable of receiving eight channels at the maximum can be inserted into the slot. Inputs of sixteen channels can be received by using two slots. Din L/R 304 represents digital inputs (Din L/R 113 shown in FIG. 1) of stereo two channels.

An internal sampler 305 inputs signals of eight channels from an unrepresented internal waveform memory tone generator. The waveform of any musical tone can be stored in each channel of the internal waveform memory tone generator. By depressing a predetermined switch, the musical tone can be generated at any time desired. For example, effects sounds such as sounds of clapping of hands may be stored and generated when necessary.

EF 306 (EF 121 shown in FIG. 1) inputs signals of stereo two channels from an unrepresented external effector (effect adding apparatus). In the recording/reproducing apparatus, digital data picked up from AUX buses of channels #1 to #6 to be described later can be input to an external effector to add effects and the digital audio data with the added effects can be returned back to the input side. EF 306 inputs such effects signals. DSP 111 may function in FIG. 3 as an unrepresented internal effector. This internal effector can add effects to digital audio data picked up from the channels #7 and #8 of AUX buses, and the digital audio data with the effects can be returned back to the input side.

Aout L/R 331 represents analog outputs of stereo two channels (Aout R/L 118 in FIG. 1). Dout L/R 332 represents digital outputs of stereo two channels (Dout L/R 119 in FIG. 1). SLout 333 and 334 represent outputs of data from option cards inserted into the two slots. Since a card capable of outputting eight channels at the maximum can be used, sixteen channels at the maximum can be output by using the two slots. OMNI 335 represents digital outputs of four channels (OMNI 120 in FIG. 1).

General buses (for recording and reproducing) 314 of eight channels are represented by BUS1 to BUS8. Recording/reproducing buses 315 of stereo two channels are represented by Stereo_L/R. Solo buses (for reproducing) 316 of stereo two channels are represented by Solo_L/R. AUX buses (for recording and reproducing) 317 are represented by AUX1 to AUX8. These buses are mixing buses.

Mixer channels 312 represent input series to the mixing buses 314 to 317 for mixing. There are twenty four mixer input channels 312 to which the operator sets 231-1 to 231-16 are allocated to perform adjustments of the frequency characteristics and volume level (by the fader shown in FIG. 2) and controls of the compressor, panning and the like (by the SEL keys shown in FIG. 2).

As indicated by arrows to the mixing buses 314 to 317 in FIG. 3, each mixing input channel can be selectively connected to any one of the mixing buses. A signal of each mixer input channel whose level was controlled by the fader can be selectively output to any one of eight general buses BUS1 to BUS8 and two Stereo_L/R buses for stereo recording. A signal of each mixer input channel before the level is adjusted can be output to two Solo_L/R buses. A signal of each mixer input channel whose level and AUX level were controlled can be output to the eight AUX buses AUX1 to AUX8. Of the twenty four channels, the first sixteen channels are provided with direct-outs for directly inputting signals to sixteen tracks of an internal recorder. Arrows from the mixer input channels 312 to a record selector 318 to be described later correspond to the direct-outs. In the direct-outs, a signal is input from the n-th input channel to the n-th track in one-to-one correspondence. A signal of each mixer input channel can be output via an output patch 321 to be described later to any one of output terminals 331 to 335.

The effect return channels 313 are two-channel series for return signal inputs from an external or internal effector. The channels are assigned the operator sets 231-15 and 231-16 described with reference to FIG. 2 so that it is possible to perform adjustments of the frequency characteristics and volume level (by the fader shown in FIG. 2) and controls of the compressor, panning and the like (by the SEL keys shown in FIG. 2). As indicated by arrows from the effect return channels 313 to the mixing buses 314 to 317 shown in FIG. 3, each of the effect return channels can be connected to any one of the mixing buses.

Each of the mixer input channels 312 and effect return channels 313 can be selectively assigned one of thirty eight inputs including the thirdy maximum external inputs (301 to 304, 306) and the eight internal inputs (305). The input patch 311 is a mechanism of performing such assignment. The window to be used for the assignment by the input patch 311 will be later described with reference to FIG. 4.

An HD recorder 319 is an internal recorder capable of recording/reproducing sixteen tracks. Each track can be selectively input with a record signal from one of thirty four buses including the eight general buses BUS1 to BUS8, sixteen direct-outs from the mixer input channels 312, two stereo recording/reproducing buses Stereo_L/R and eight AUX buses AUX1 to AUX8. This assignment is performed by the record selector 318. A window to be used for the assignment by the record selector will be later described with reference to FIG. 4. This assignment can be performed more easily on windows to be described with reference to FIG. 6 and following Drawings by turning on the QUICK REC key 267.

A reproduced output of each track of the HD recorder 319 is supplied to the recorder channels 320. There are sixteen recorder channels in correspondence with the sixteen tracks of the internal recorder. By turning on the RECORDER key 266 shown in FIG. 2, it is possible with respect to an input signal of each recorder channel 320 to perform adjustments of the frequency characteristics and volume level (by the fader shown in FIG. 2) and controls of the compressor, panning and the like (by the SEL keys shown in FIG. 2). Each recorder channel is supplied with a record input of the corresponding track (if data reproduced from the HD recorder 319 is supplied again via BUS to the HD recorder) or with a reproduced output of the corresponding track. A signal of each recorder channel 320 whose level was controlled by the fader can be selectively output to one of the eight general buses BUS1 to BUS8 and two stereo record buses Stereo_L/R. A signal of each recorder channel 320 before the level is controlled can be output to one of the two solo buses Solo_L/R. A signal of each recorder channel 320 whose level and AUX level were controlled can be output to one of the eight AUX buses AUX1 to AUX8.

Data from each of the mixing buses 314 to 317 and mixer input channels 312 can be selectively output to each of the output terminals 331 to 335. This assignment is performed by the mechanism of the output patch 321. A window to be used for the assignment by the output patch 321 will be later described with reference to FIG. 5.

Figure 4:
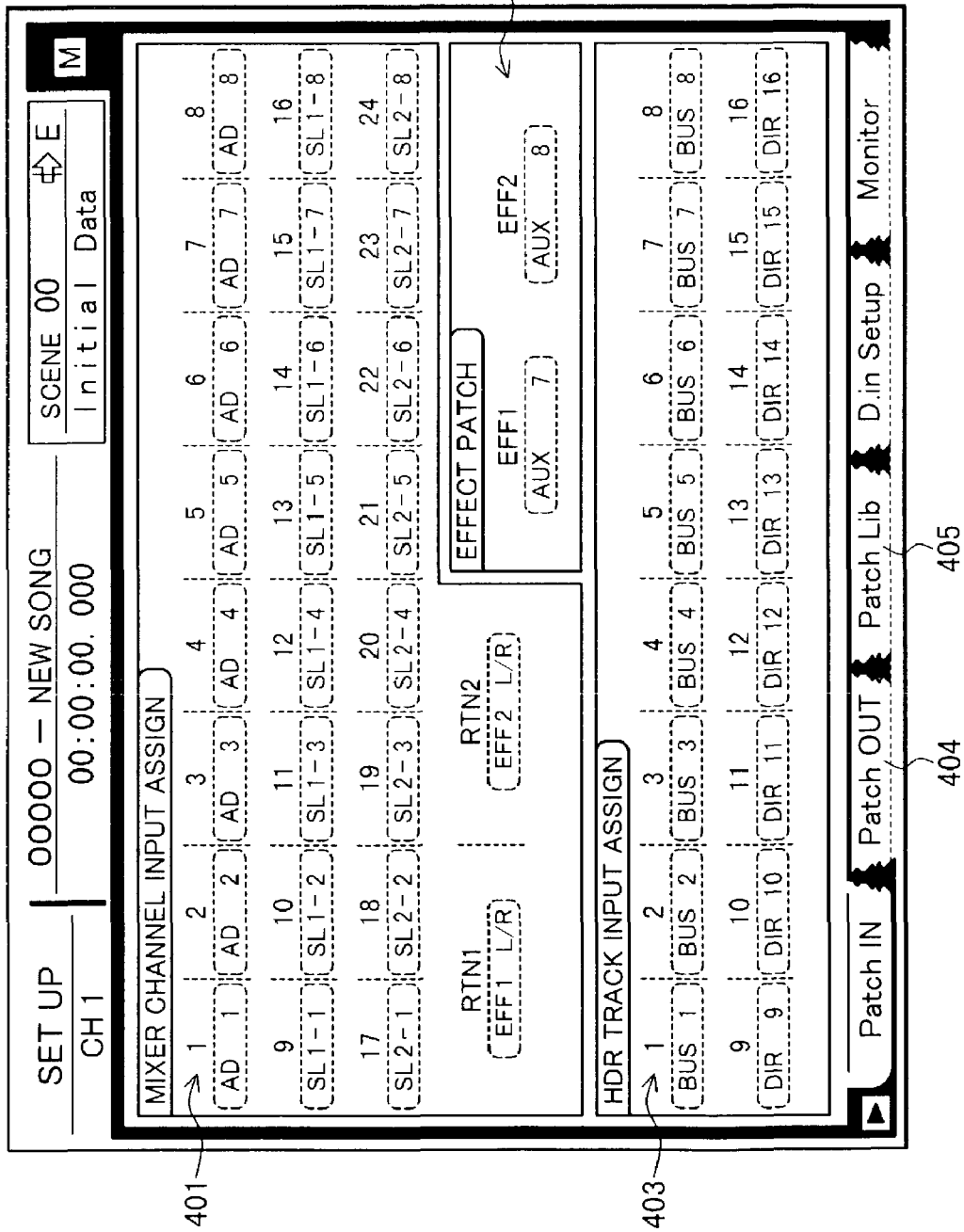
FIG. 4 shows an example of a window to be used for assignment by an input patch and a record selector.

FIG. 4 shows an example of a window to be used for the assignments by the input patch 311 and record selector 318. This window is displayed when the SETUP key 265 shown in FIG. 2 is turned on.

In FIG. 4, a MIXER CHANNEL INPUT ASSIGN area 401 is used for designating which inputs 301 to 306 are assigned to the mixer input channels #1 to #24 and effect return channels. Numerals "1" to "24" represent the mixer input channels #1 to #24, and the assigned inputs are shown under the numerals as "AD1", "AD2", . . . , "SL1-1", . . . , "SL2-1", . . . "AD1", "AD2", . . . represent the first, second, . . . analog inputs AD 301. "SL1-1", . . . represent the first, second, . . . option card inputs 302 of the first slot. "SL1-2", . . . represent the first, second, . . . option card inputs 302 of the second slot. "RTN1" and "RTN2" represent the inputs to the effect return channels 313. "EFF1 L/R" and "EFF2 L/R" assigned to "RTN1" and "RTN2" indicate that the effect inputs EF 306 are assigned to the effect return channels 313.

An EFFECT PATCH area 402 is used for designating which inputs are assigned to the internal effectors. "EFF1" and "EFF2" represent internal effectors. In this case, inputs from AUX7 and AUX8 are input to the internal effectors.

An HDR TRACK INPUT ASSIGN area 403 is used for the assignment by the record selector 318. Numerals "1" to "16" represent sixteen tracks, and the assigned inputs are shown under the numerals as "BUS1", "BUS2", . . . , "DIR1", "DIR2", . . . . "BUS1", "BUS2", . . . represent inputs from the general buses BUS1 to BUS8. "DIR1", "DIR1", ... represent inputs from the direct-outs of the mixer input channels 312.

By using the window shown in FIG. 4, inputs to each mixer input channel 312, each internal effector, and each track of the HD recorder 319 can be set. For example, when an input to each input channel is to be set, the cursor is moved to the display area of a desired input channel by using the cursor motion keys 221, and then the value input operator unit (data input dial) 222 is manipulated to sequentially display available inputs to the input channel and select a desired input. It is apparent that an external input from the slot can be selected as an input source only when an input card is inserted into the slot.

Figure 5:
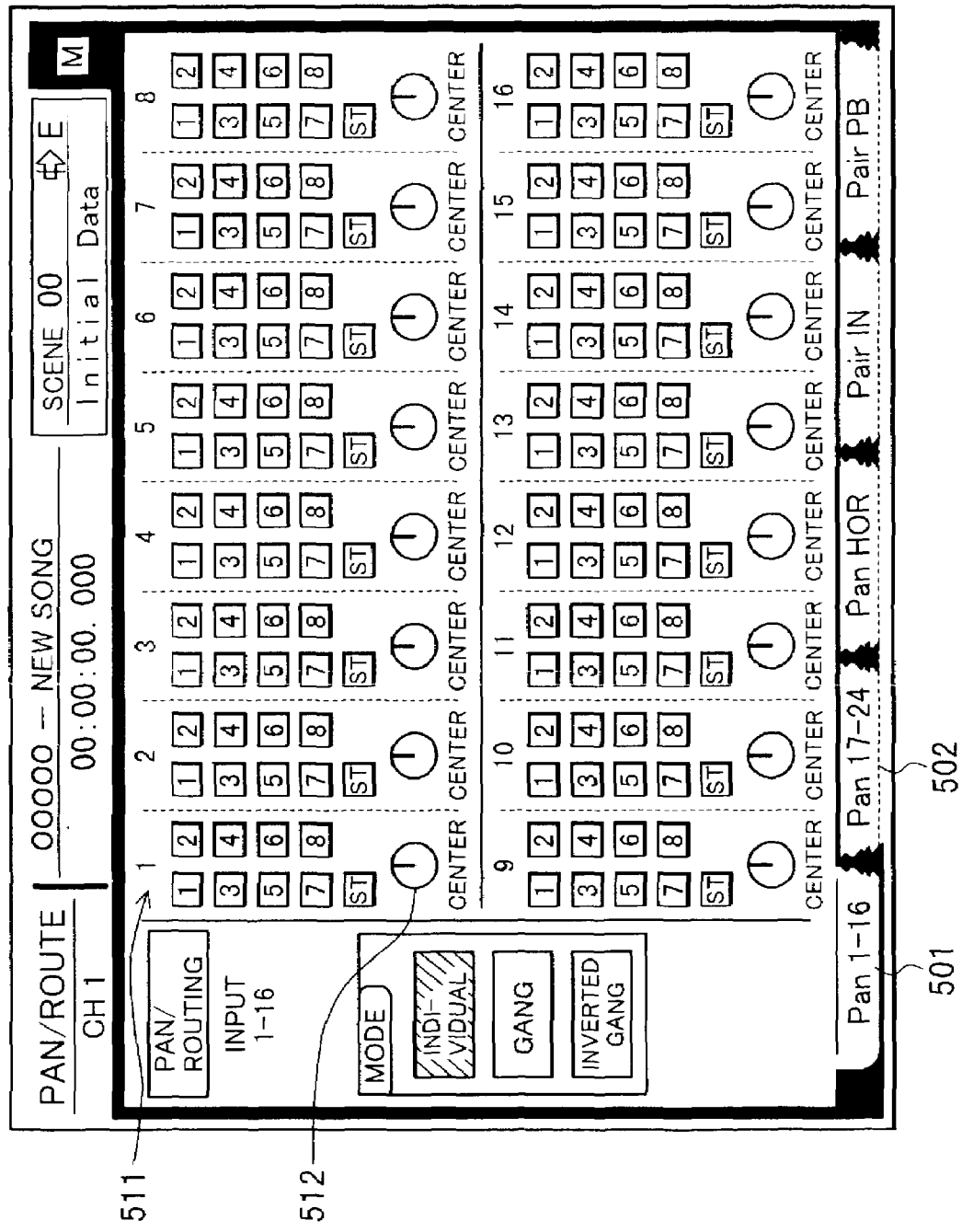
FIG. 5 shows a window illustrating how each input channel is output to what general bus.

FIG. 5 shows a window to be used for designating whether each input channel (mixer input channel) is output to which one of the general buses BUS1 to BUS8. A Pan 1-16 button 501 is used for the input channel #1 to #16, and a Pan 17-24 button 502 is used for the input channel #17 to #24. Display contents 511 for the input channel #1 indicate that outputs are assigned to the general buses BUS1 to BUS8 or the stereo record buses Stereo_L/R. Numerals "1" to "8" surrounded by squares represent the general buses BUS1 to BUS8, and "ST" surrounded by a square represents the stereo record buses Stereo_L/R. If the numeral or characters ST are displayed in reversed color, it means that the corresponding output is assigned. A setting display 512 indicates a pan (right and left orientation) of the input channel #1.

In this apparatus, inputs (mixer input channels) from other apparatuses and inputs (recorder channels) reproduced by the recorder are distinguished. The mixer input channels are distinguished from the recorder channels as in the following.

Inputs to the mixer input channels can be changed by patching. Inputs to the recorder channels are fixed to the predetermined tracks of the recorder. Since this correspondence is fixed, a user can easily understand the connection state.

The mixer input channels #1 to #16) have connections (direct-outs) for directly inputting signals to the channel #1 to #16 of the recorder without involvement of the mixing buses. The recorder channels have no direct connections to the recorder.

Figure 6:
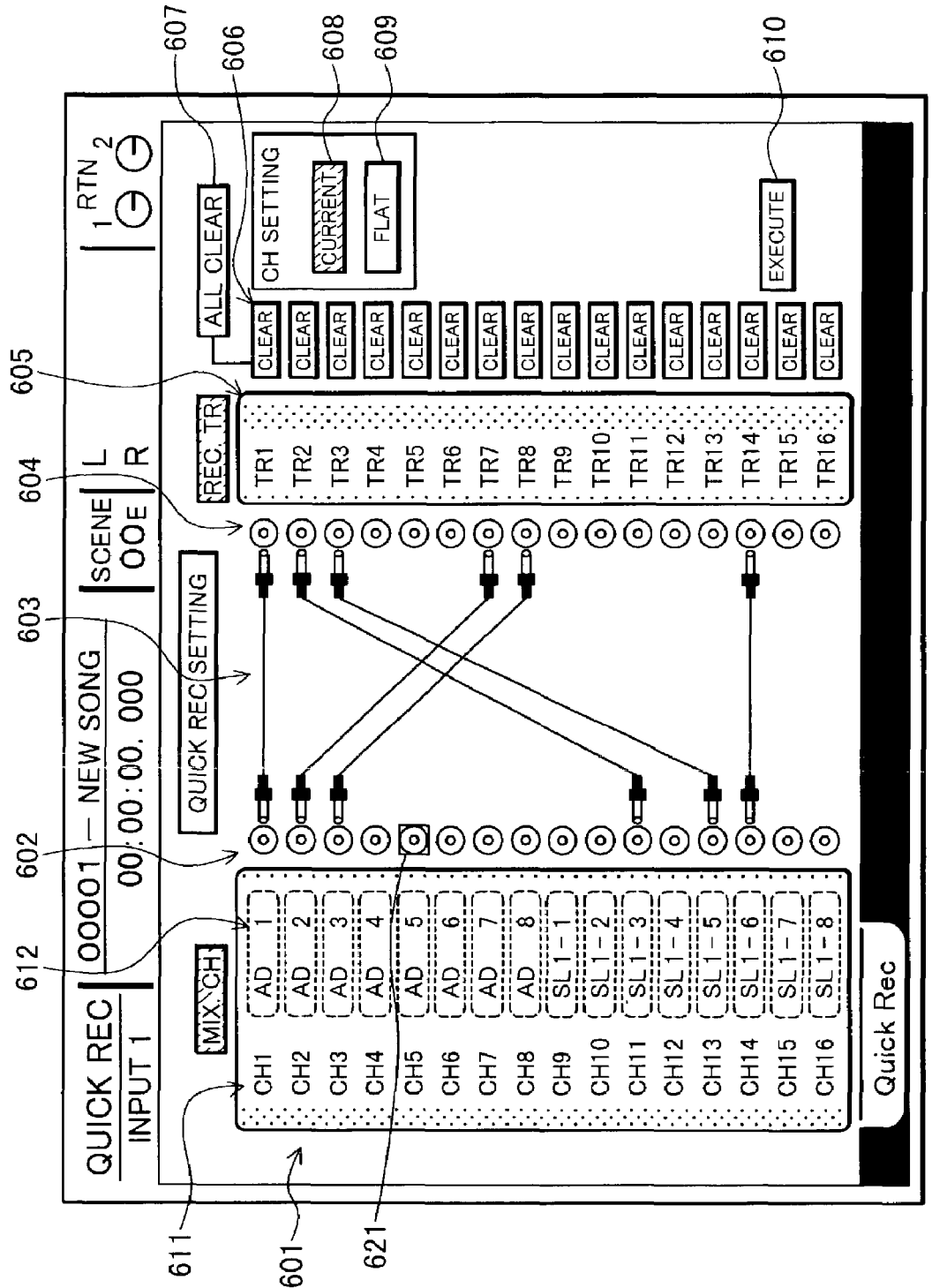
FIG. 6 is a diagram showing a first example of a quick record setting window.

FIG. 6 shows a quick record setting window to be displayed when the QUICK REC key 267 is turned on. This window is displayed by reading data from a predetermined buffer. When the power of the apparatus is first tuned on, the window shown in FIG. 6 is displayed which reflects the setting state entered in the patch window shown in FIG. 4. In this case, connections in the window are cleared. As will be later described, after various connections are edited on the window shown in FIG. 6, this edition is reflected upon the buffer irrespective of whether the edition is executed in response to turning on an EXECUTE button or whether the edition is canceled by an EXIT key. Therefore, when the QUICK REC key 267 is turned on, the quick record setting window reflecting the state immediately before the key is turned on is reflected. Connections can be edited visually on this window so that a patch operation between input sources and record tracks can be made easily. If the REC key 254 and PLAY key 253 are depressed at the same time, the real record state can be navigated.

Referring to FIG. 6, in a display area 601, a channel number of each channel and input sources (AD1, SL1-1, and etc.) are displayed. A change in settings of the mixer input channels cannot be made on this window. CH1 to CH16 displayed in a display area 611 correspond the channels #1 to #16 of the mixer input channels 312 and this display is fixed. CH1 to CH16 are the numbers of the mixer input channels. In a display area 612 on the right side of the channel number display area 611, input sources to the channels are displayed. An input source can be changed by the operation to be described later. In a display area 605, track numbers TR1 to TR16 are displayed and this display is fixed. TR1 to TR16 are the numbers of the record tracks. Terminals 602 and terminals 604 are used as connection terminals, and prepared for the mixer input channels CH1 to CH16 and track input channels TR1 to TR16. A display 603 of a plug and a cord is used for connecting the terminals and display a patch state. The display 603 of the plug and cord between the terminals 602 and 604 can be set as desired to change the patch state.

There are a CURRENT bottom 608, a FLAT button 609, CLEAR buttons 606, an ALL CLEAR button 607 and an EXECUTE button 610. The cursor is moved to a desired button by using the cursor motion keys 211 and the enter key is depressed to turn on the button.

Figure 10:
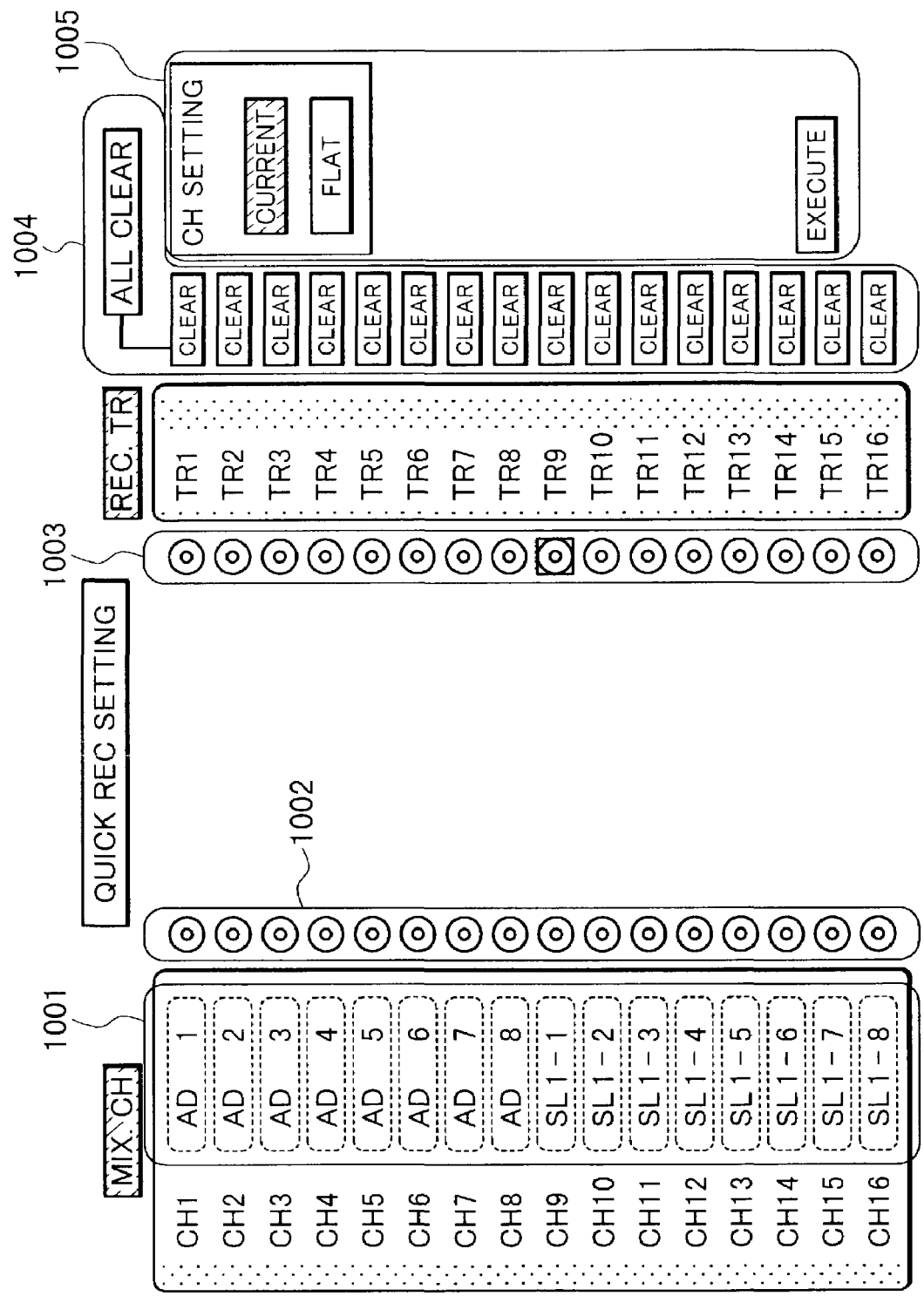
FIG. 10 is a diagram illustrating a cursor motion (right and left directions) on a quick record setting window.

With reference to FIGS. 10 and 11, how the cursor is moved on the window shown in FIG. 6 will be described. The cursor can be moved up/down and right/left by using the cursor motion keys 221. The positions of the cursor where the assignment can be set are fixed. The assignment can be set with the cursor only in areas 1001 to 1005 shown in FIG. 10. In the area 1001, the input sources allocated to the mixer input channels are displayed. The cursor can be moved to each input source. In the area 1002, the terminal for each mixer input channel is displayed. The cursor can be moved to each terminal. In the area 1003, terminals corresponding to record tracks are displayed. In the area 1004, a clear button group is displayed. The cursor can be moved to each clear button. In the area 1005, the CURRENT button 608, FLAT button 609 and EXECUTE button 610 are displayed. The cursor can be moved to each button. As the cursor is moved right and left, it moves throughout these areas 1001 to 1005.

FIG. 11 shows the area in which the cursor moves up and down. At the uppermost row, the cursor is in an area 1101. As the cursor is moved down from the uppermost row, the cursor enters an area 1102 and then enters an area 1103 at the lowermost row.

The area where the cursor can move is fixed. In this area, as a user manipulates the up/down and right/left direction cursor motion keys, the cursor moves up/down and right/left corresponding in visual amount to the operation degree of the keys. The operation of the quick record setting on the window shown in FIG. 6 will be described.

Figure 9:
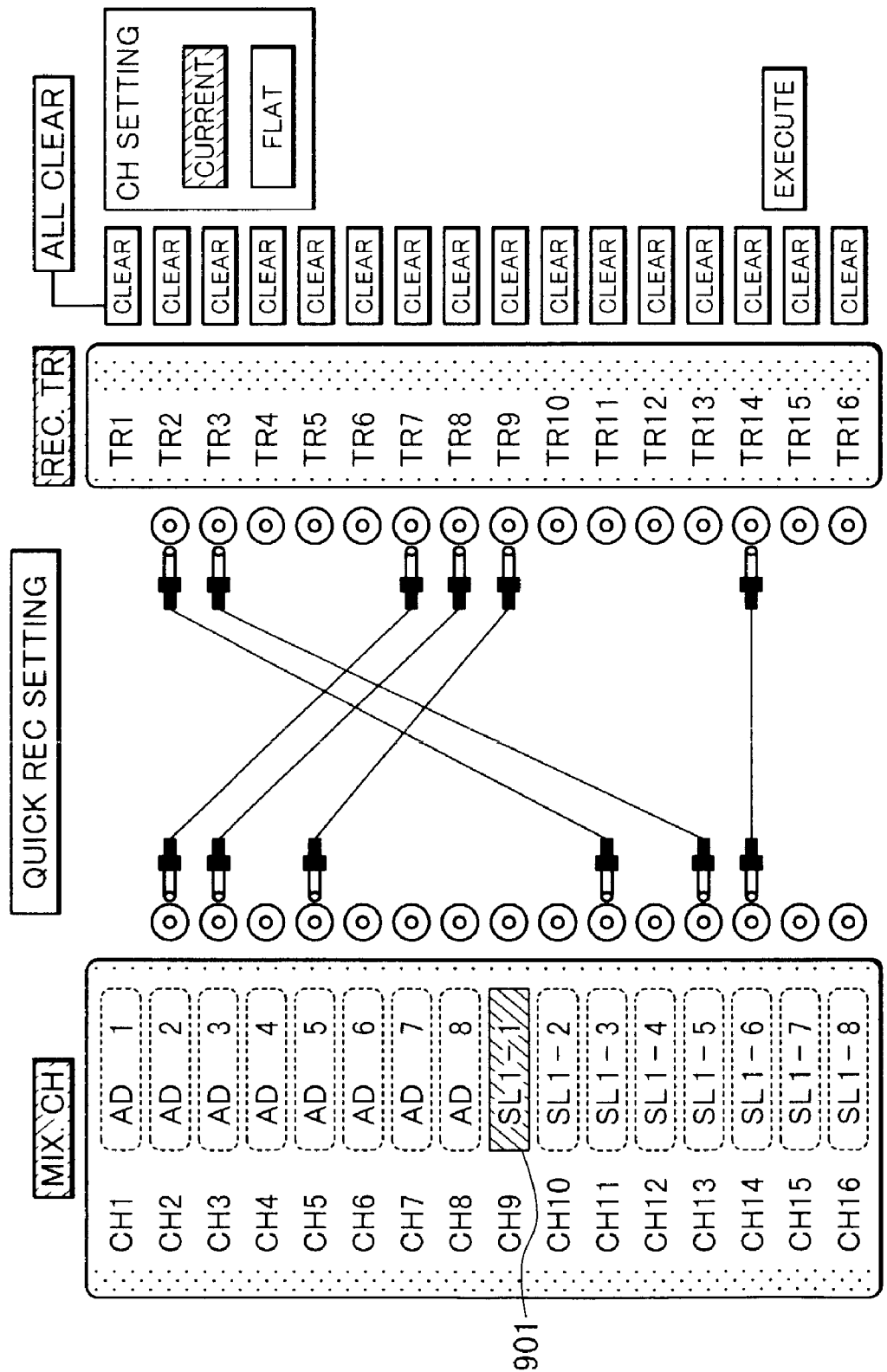
FIG. 9 is a diagram showing a fourth example of a quick record setting window.

After the cursor is moved to one of the mixer input channels CH1 to CH16 in the area 612, the data input dial 222 is rotated to sequentially display selection candidates "AD1" to "AD8", "SL1-1" to "SL1-8", "SL2-1" to "SL2-8", "Din L", "Din R", "MET", and "SMP1" to "SMP8". By selecting a desired input source, the input source of the channel can be changed. "AD1" to "AD8" correspond to the analog inputs 301, "SL1-1" to "SL1-8" and "SL2-1" to "SL2-8" correspond to the inputs from the cards inserted into the slots 302 and 303. "Din L" and "Din R" correspond to the digital inputs 304. "MET" corresponds to the input from a metronome, and "SMP1" to "SMP8" correspond to the inputs from the internal sampler 5. The state indicated at 901 in FIG. 9 corresponds to the state that the input source is set to SL1-1 by moving the cursor to the channel CH9 and operating the data input dial 222 to select SL1-1. This state is loaded in the buffer.

The mixer input channels CH1 to CH16 and record tracks TR1 to TR16 may be connected in one-to-one correspondence or in one-to-multiple correspondence. A multiple-to-one correspondence is not possible. Settings other than those described above are made by using a more detailed patch window.

Wirings between the mixer input channels CH1 to CH16 and record tracks TR1 to TR16, i.e., connections between the terminals 602 and terminals 604, are established in the following manner. In the following, selecting first one of the mixer input terminals CH1 to CH16 and selecting first one of the record tracks TR1 to TR16 will be described separately.

If one of the mixer input channels CH1 to CH16 is to be first selected, the cursor is moved to one of the mixer input channels CH1 to CH16 and the enter key 223 is depressed to select the desired mixer input channel. When the enter key 223 is depressed, the number of the selected mixer input channel and the input source are displayed in reversed color. This reversed color display of the number of the mixer input channel and the input source is maintained unchanged during the following wiring work. After the mixer input channel is selected, the cursor is inhibited to move in the area other than the mixer input channel display area 1002 in FIG. 10 and the record track display area 1003 in FIG. 10, until the wiring work is completed.

After the mixer input channel is selected and if the cursor is moved to a different mixer input terminal and the enter key 223 is depressed, the selection state of the first selected channel is released and the newly designated channel is selected. After the mixer input channel is selected and if the cursor is moved to the same mixer input channel and the enter key 223 is depressed, the selection state of the channel is released and the wiring work is terminated.

After the mixer input channel is selected and if the cursor is moved to one of the terminals 604 of the record tracks, one of the record track numbers TR1 to TR16 at which the cursor is set is displayed in reversed color. In this state, if the cursor is moved up and down in the area 1003 shown in FIG. 10, the number to be displayed in reversed color is changed. Irrespective of how record settings are entered, the cursor can be moved to any one of the track terminals. When the enter key 223 is depressed after the cursor is moved to the desired track terminal, the track can be selected and the wiring work is completed. After this wiring work, the reversed color display is changed to the initial display. The plug and cord are drawn on the window. After the wiring work, the limited motion of the cursor is released.

Figure 7:
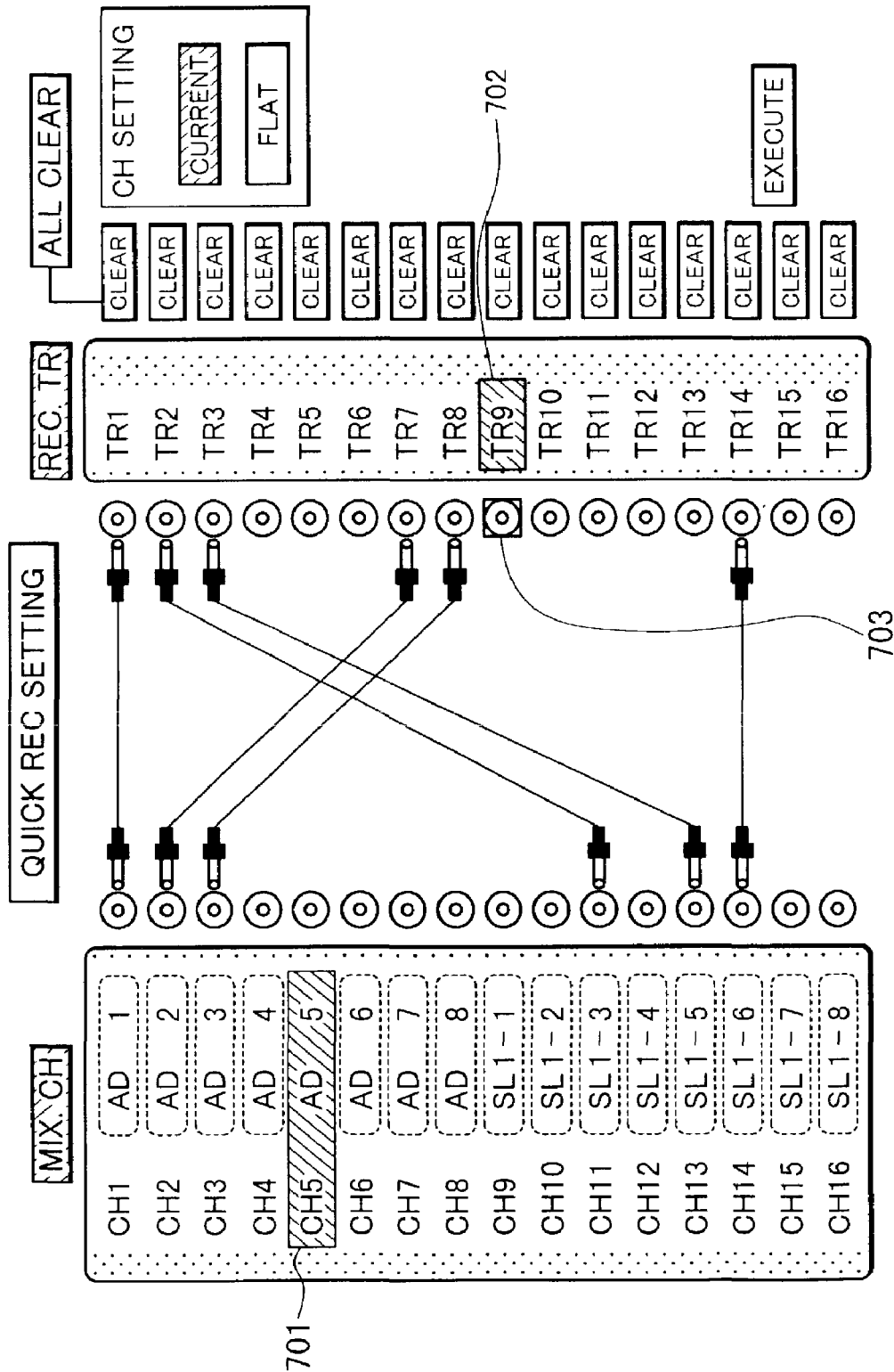
FIG. 7 is a diagram showing a second example of a quick record setting window.
Figure 8:
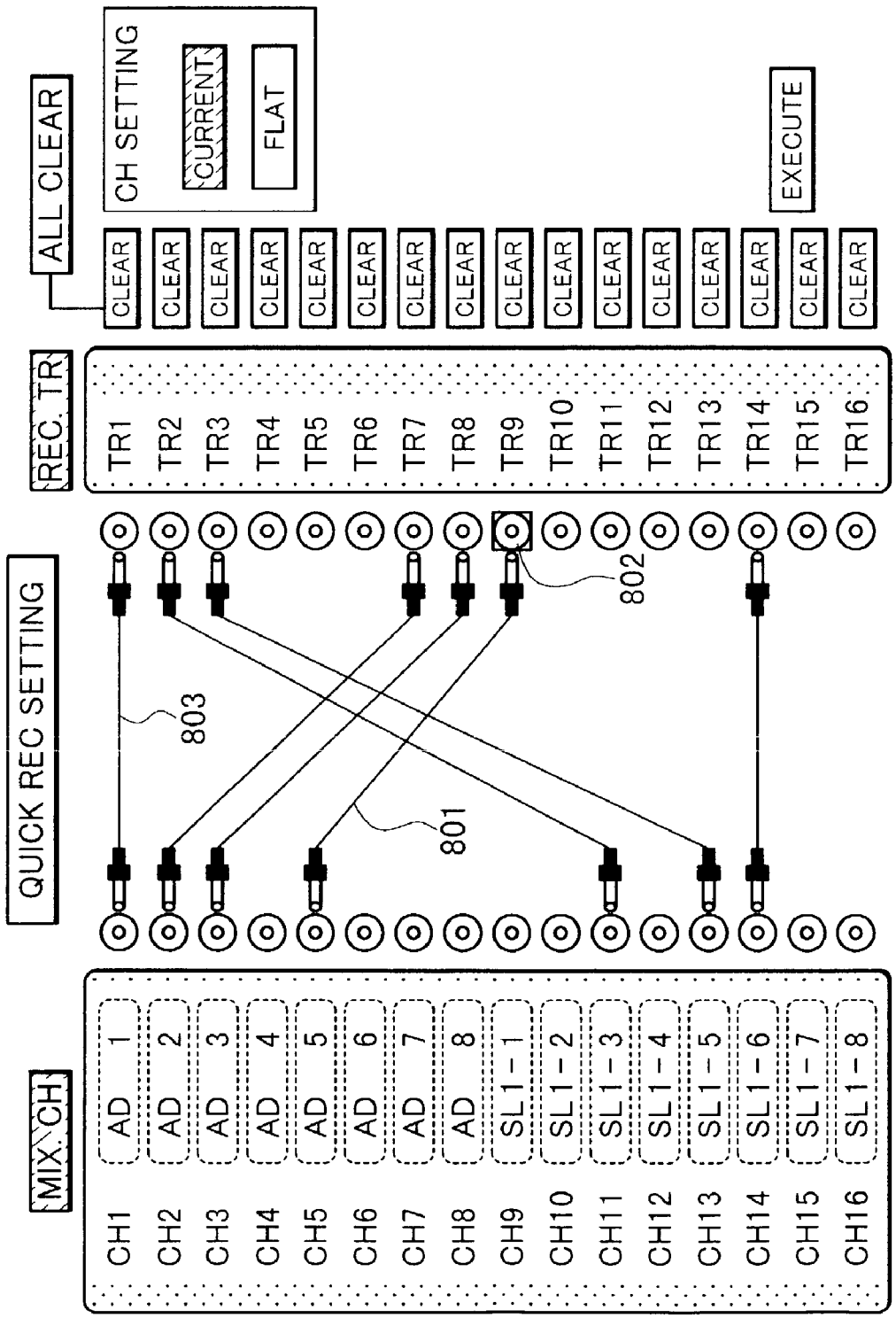
FIG. 8 is a diagram showing a third example of a quick record setting window.

The window shown in FIG. 6 displays the cursor 621 set to the terminal of CH5. The window shown in FIG. 7 shows the cursor moved to the terminal of TR9 after the channel CH5 is selected and an area 701 is displayed in reversed color. An area 702 of the channel TR9 is displayed in reversed color, and the cursor is set to the terminal 703 of the channel TR9. In this state, when the enter key 223 is depressed, a connection 801 shown in FIG. 8 is completed.

If the cursor is set to the terminal of the track already set as the record destination and the enter key 223 is depressed, the already set connection is made invalid, and the newly set connection is made valid to thereafter terminate the wiring work.

If one of the record tracks TR1 to TR11 is to be first selected, the cursor is moved to the terminal of one of the track channels TR1 to TR16 and the enter key 223 is depressed to select the desired record track of the recorder. When the enter key 223 is depressed, the number of the selected track is displayed in reversed color. This reversed color display of the number of the track is maintained unchanged during the following wiring work. After the track is selected, the cursor is inhibited to move in the area other than the mixer input channel display area 1002 in FIG. 10 and the record track display area 1003 in FIG. 10, until the wiring work is completed.

After the track is selected and if the cursor is moved to a different track and the enter key 223 is depressed, the selection state of the first selected track is released and the newly designated track is selected. After the track is selected and if the cursor is moved to the same track and the enter key 223 is depressed, the selection state of the track is released and the wiring work is terminated.

After the track is selected and if the cursor is moved to one of the mixer input terminals 602, the number of the mixer input channel corresponding to the terminal and the input source are displayed in reversed color. in this state, if the cursor is moved up and down in the area 1002 shown in FIG. 10, the number and input source to be displayed in reversed color are changed. The cursor can be moved to any one of the mixer input channels. When the enter key 223 is depressed after the cursor is moved to the desired mixer input channel, the mixer input channel can be selected and the wiring work is completed. After this wiring work, the reverse display is changed to the initial display. The plug and cord are drawn on the window. After the wiring work, the limited motion of the cursor is released.

The CLEAR button 607 is provided for each of the tracks and is used for releasing the connection of the track. When the ALL CLEAR bottom is turned on, the connections of all tracks can be released.

Irrespective of whether the EXECUTE button 607 is depressed, the connections displayed on the window are loaded in the buffer each time one wiring line is connected or released on the window.

Either one of the CURRENT button 608 and FLAT button 609 is always on, and these buttons operate in a toggle manner. Namely, when the FLAT button 609 is turned on while the CURRENT button 608 is on, the CURRENT button 608 is forcibly turned off. The opposite case is also true. When the EXECUTE button 607 is turned on, the patch state displayed on the window (assignment of input signals to the mixer input channels and connections of the mixer input channels to the record tracks) is executed. In this case, the setting state of the mixer input channels selected as record sources is either set to the initial state or maintained as it is, depending on whether the CURRENT button 608 is on or the FLAT button 609 is on. If the setting state of the mixer input channels is initialized after the quick record setting as in a conventional case, the same setting is required to enter again. in this embodiment, if the CURRENT button 608 is maintained on, the setting state of the mixer input channels selected as the record sources is maintained so that it is easy for the user to use this apparatus. If the setting state of the mixer input channels is desired to be initialized, the FLAT button 609 is depressed.

After the connection is set or released in the above manner, the EXECUTE button 610 is depressed to perform the following processes.

Figure 12A:
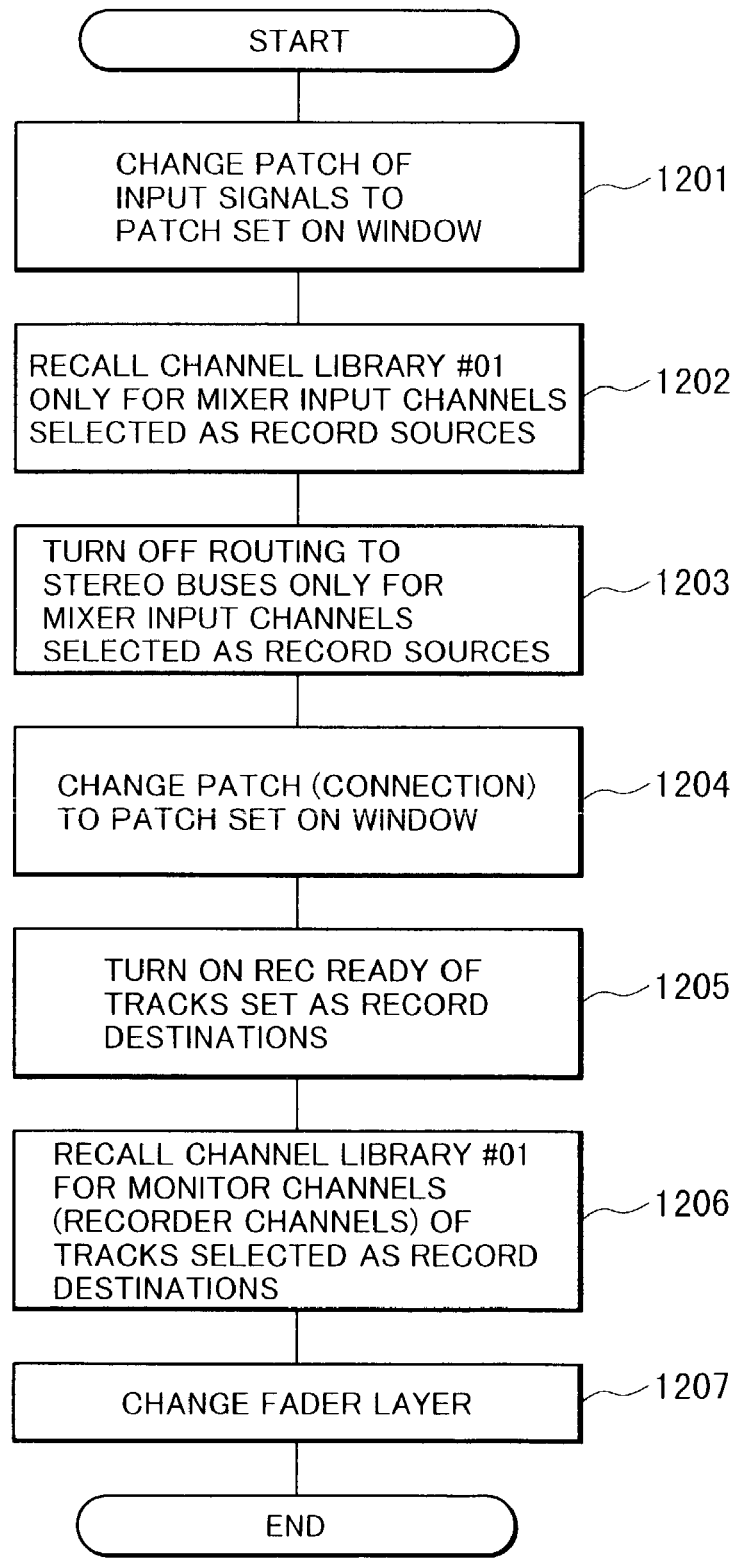
FIG. 12 is a flow chart illustrating a process to be executed when an EXECUTE button is clicked.

FIG. 12A is a flow chart illustrating the processes to be executed when the EXECUTE button 607 is turned on while the FLAT button 609 is turned on. At Step 1201, the assignment (input patch) of input signals to the mixer input channels is changed to the assignment displayed on the window. At Step 1202, a channel library #01 is called only for the mixer input channels selected as the record sources. The channel library is a file storing various setting conditions such as the setting conditions of a compressor, an equalizer and the like, the setting conditions of the levels and the like of the faders, and the routing setting conditions indicating the output destination of each mixer input channel. As the channel library, a plurality of preset files are prepared in HD 108. The channel library #01 is a file storing the standard setting conditions. At Step 1202, therefore, the standard setting conditions are set to the mixer input channels selected as the record sources. With the standard setting conditions, the compressor, equalizer and the like are set flat (not in operation), the fader is set to a standard level of 0 dB (the volume is not necessarily 0), and the routing is on only for the stereo buses. Next, at Step 1203, the routing to the stereo buses is set off only for the mixer input channels selected as the record sources. This setting is made because the stereo buses 315 are used for the record monitor buses.

If paired mixer input channels are selected as the record sources, this paring is released and the channel library #01 is called only for the mixer input channels selected as the record sources.

Next, at Step 1204, the connection patch between the mixer input channels and record tracks wired on the window is changed. In an recorder track input assign area (an HDR TRACK INPUT ASSIGN area 403 in FIG. 4), the direct-outs for the mixer input channels selected as the record sources are assigned. At Step 1205 a REC READY of each track selected as the record destination is turned on. The track with the turned-on REC READY is used as the record track. In this embodiment, since the direct-outs are used by the quick record setting, it is possible to maintain unchanged the settings of other mixer input channels, recorder channels, mixing buses and the like which were not subjected to the quick record setting.

At Step 1206 the channel library #01 is called for the monitor channels (recorder channels 320) of the tracks selected as the record destinations. The outputs of the recorder channels are therefore routed to and mixed at the stereo buses 315. A user can monitor the record by connecting outputs of the stereo buses to a monitor sound system by using the output patch. In this case, if paired channels are selected as the record destinations, this paring is released and the channel library #01 is called for the channels selected as the record destinations. Lastly, at Step 1207 a fader layer for the channels #1 to #16 are set to the selection state and the page of the window is changed to a predetermined page to terminate the processes.

Figure 12B:
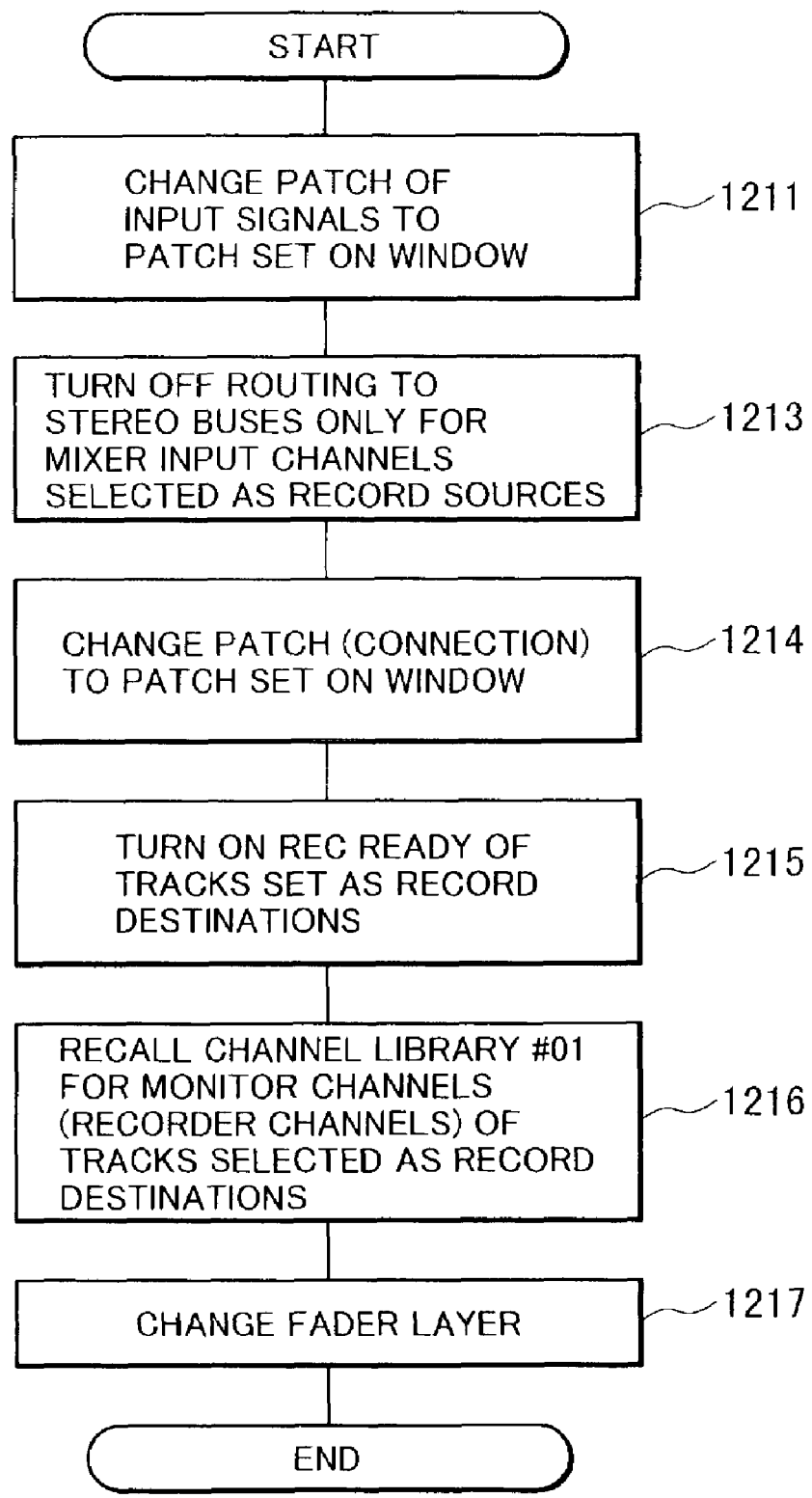
Figure 13:
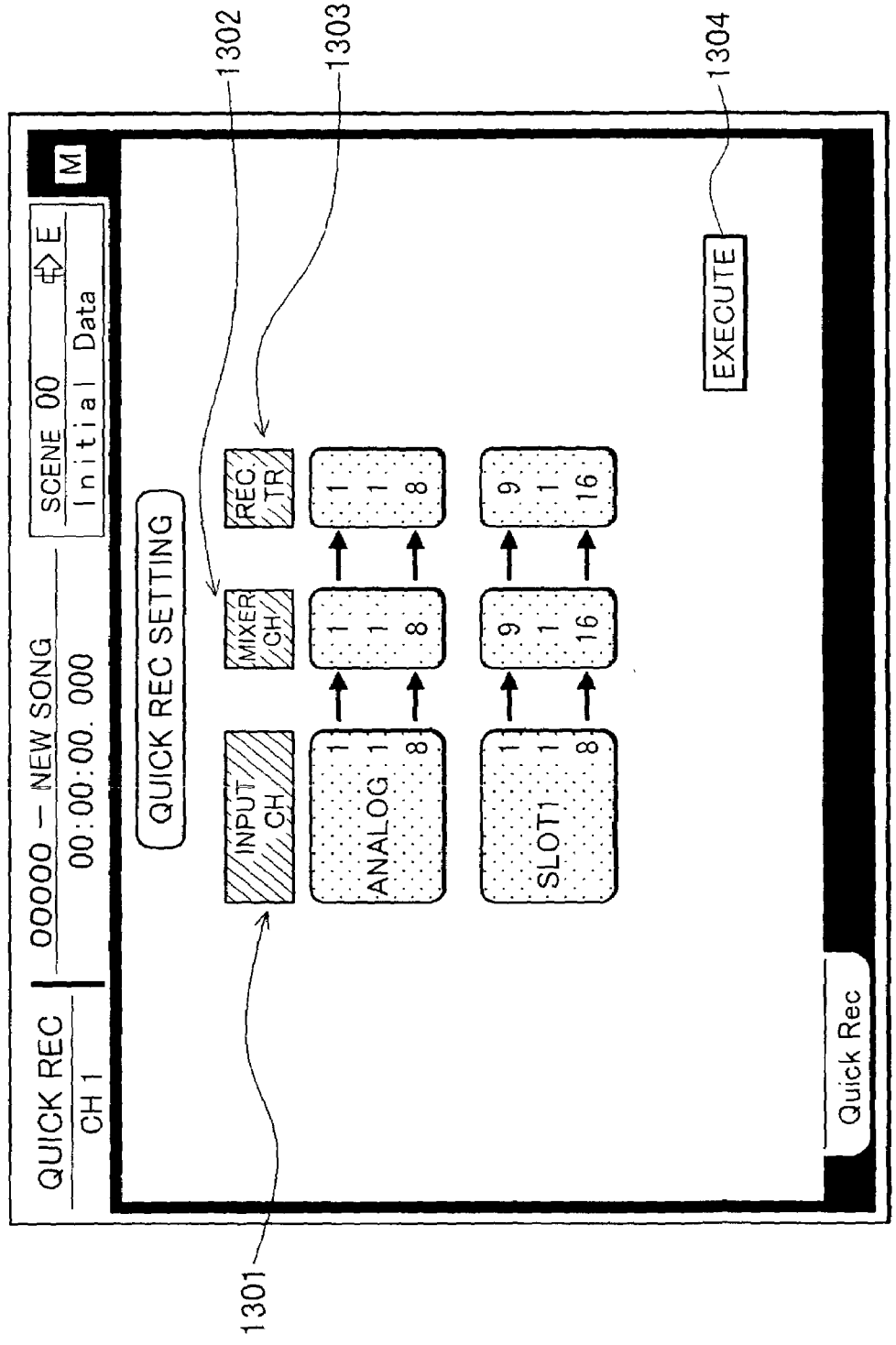
FIG. 13 shows a quick REC window.

FIG. 12B is a flow chart illustrating the processes to be executed when the EXECUTE button 607 is turned on while the CURRENT button 608 is turned on. Step 1211 corresponds to Step 1201 shown in FIG. 12A, and Steps 1213 to 1217 correspond to Steps 1203 to 1207 shown in FIG. 12A. While the CURRENT button 608 is on, Step 1202 shown in FIG. 12A is not executed. Since Step 1202 is not executed while the CURRENT button 608 is on, the setting conditions of the mixer input channels selected as the record sources are not initialized but maintained unchanged. When routing of the assignment of the mixer input channels selected as the record sources to the stereo buses is turned off at Step 1213 (without changing the other settings), the assignment of both paired channels to the stereo buses is turned off if one of the paired channels is used as the record source, and the other is not used as the record source.

In both the processes illustrated in FIGS. 12A and 12B, the setting conditions of mixer input channels not designated as the record sources are maintained unchanged (the selection as the record sources is not designated). For the routing to the monitor stereo buses 315, the recorder channels selected as the record destinations are routed to the stereo buses, whereas the setting conditions of the routing of recorder channels not selected as the record destinations are inherited as they are. With this settings, it is possible to monitor the record and maintain unchanged the setting conditions of tracks not designated as the record sources. Routing of the tracks not designated as the record destinations to the stereo buses 315 may be inhibited. By inhibiting the routing, only the record tracks can be monitored. Routing of the recorder channels not selected as the record destinations may be inherited in one mode or this routing to the stereo buses 315 may be inhibited in another mode.

Since the quick record setting is executed by depressing the EXECUTE button 610, or in other words, since the quick record setting (an input patch of input channels, various settings of input channels, track settings and the like) is not executed before the EXECUTE button 610 is depressed, the quick record setting windows described with reference to FIGS. 6 to 9 can be exited by depressing an unrepresented EXIT key.

Although the patch (input patch) is reflected on the contents in the HDR TRACK INPUT ASSIGN area 403 shown in FIG. 4, the patch set in the HDR TRACK INPUT ASSIGN area 403 is not reflected on the contents of the quick record setting window. When the quick record setting window is accessed from another window, the connections stored in the buffer are displayed. As a default (immediately after the power is turned on), the contents of the current scene only for the input patch are reflected without any connection, and a library for quick record setting is not prepared.

The present invention has been described in connection with the preferred embodiments. The invention is not limited only to the above embodiments. It is apparent that various modifications, improvements, combinations, and the like can be made by those skilled in the art.

What we claim are:

1. A multi-track digital recording/reproducing apparatus for recording/reproducing multi-track digital audio data, comprising:

a multi-track recorder that records/reproduces digital audio data to/from a plurality of recording tracks;

an input patch that, in response to a user operation, selectively assigns one of a plurality of input terminals to each one of a plurality of mixer input channels, wherein said each one of the mixer channels is supplied with audio data from the assigned one of the input terminals;

a mixing bus that, in response to a user operation, selectively inputs audio data from said mixer input channels and/or audio data reproduced by the multi-track recorder, mixes the input audio data, and outputs the mixed audio data;

a track assigner that, in response to a user operation, assigns one of said mixing bus and the input channels to at least one of the plurality of recording tracks, wherein said at least one of the tracks is supplied with the audio data output from one of the assigned mixing bus and the assigned mixer input channel directly, and records the supplied audio data;

an instruction device that, in response to a user operation, issues an instruction of a quick recording setting that designates, for each of arbitrarily selected one or plurality of the mixer input channels, one of the input terminals and one of the plurality of recording tracks; and a quick recording setting device that, in response to said instruction of a quick recording setting, assigns the designated input terminal to the designated recording track so that the designated recording track is supplied with audio data, to be recorded, from the designated input terminal via the arbitrarily selected one or more of the mixer input channels, wherein the user setting of said input patch and said mixing bus are left unchanged with respect to the channels other than the arbitrarily selected one or more of the mixer input channels.

2. A multi-track digital recording/reproducing apparatus according to claim 1, wherein said quick recording setting device routes the audio data output from the recording track or tracks designated by said instruction to a monitor bus, and leaves unchanged the routing of the audio data output from the recording tracks other than the designated track or tracks.

3. A multi-track digital recording/reproducing apparatus according to claim 1, wherein said quick recording setting device routes the audio data output from the recording track or tracks designated by said instruction to a monitor bus, and inhibits the routing of the audio data output from the recording tracks other than the designated track or tracks to a monitor bus.

4. A multi-track digital recording/reproducing apparatus according to claim 1, further comprising
  a switching device that switches a first mode and a second mode, and wherein
  the quick recording setting device sets a predetermined standard setting condition to the selected mixer input channel in the first mode, and does not change setting condition of the selected mixer input channel in the second mode,
  wherein each of the mixer input channels includes a compressor, and equalizer, and a fader, and
  wherein, when one mixer input channel is in the predetermined standard setting condition, the compressor and the equalizer of the mixer input channel are set flat, and the fader of the mixer input channel is set to a predetermined standard level.

5. The multi-track digital recording/reproduction apparatus according to claim 1, wherein the quick recording setting device sets a predetermined standard setting condition to the selected mixer input channel,
  wherein each of the mixer input channels includes a compressor, an equalizer, and a fader, and
  wherein, when one mixer input channel is in the predetermined standard setting condition, the compressor and the equalizer of the mixer input channel are set flat, and the fader of the mixer input channel is set to a predetermined standard level.

6. A multi-track digital recording/reproducing apparatus for recording/reproducing multi-track digital audio data, comprising:

a multi-track recorder that records/reproduces digital audio data to/from a plurality of recording tracks;

an input channel assigner that, in response to a user operation, selectively assigns one of a plurality of input terminals to each one of a plurality of mixer input channels, wherein said each one of the mixer channels is supplied with audio data from the assigned one of the input terminals;

a mixing bus that, in response to a user operation, selectively inputs audio data from said mixer input channels and/or audio data reproduced by the multi-track recorder, mixes the input audio data, and outputs the mixed audio data;

a track assigner that, in response to a user operation, assigns one of said mixing bus and the input channels to at least one of the plurality of recording tracks, wherein said at least one of the tracks is supplied with the audio data output from the assigned one of said mixing buses and the input channels;

a display that displays setting screen for recording operation graphically showing at least one first assignment of one of said input terminals to each of said mixer input channels, and at least one second assignment of each of said mixer input channels to one of said recording tracks, independently of the actual assignments in said input channel assigner and said track assigner;

an assignment editor that, in response to a user operation, edits said at least one first and second assignments shown in said quick setting screen for recording operation; and an executing device that, in response to an execution command from a user, sets said at least one first assignment shown in said quick setting screen to said input channel assigner, and said at least one second assignment shown in said quick setting screen to said track assigner, simultaneously while leaving unchanged the assignments of the mixer input channels in said input channel assigner and said track assigner that are unrelated to said at least one first or second assignments.

* * * * *